(12) United States Patent
Nomura

(10) Patent No.: US 6,388,904 B2
(45) Date of Patent: *May 14, 2002

(54) POWER SUPPLY DEVICE FOR ELECTROMOTIVE RAILCAR

(75) Inventor: Yoshihito Nomura, Tokyo (JP)

(73) Assignee: Kabushiki Kaisha Toshiba, Kawasaki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/234,714

(22) Filed: Jan. 21, 1999

(30) Foreign Application Priority Data

Jan. 30, 1998 (JP) ............................. 10-018873

(51) Int. Cl.$^7$ ................................. H02M 7/00
(52) U.S. Cl. .............................. 363/71; 363/37; 363/97; 363/132
(58) Field of Search .................. 363/34, 35, 37, 363/39, 40, 44, 45, 47, 65, 71, 97, 132

(56) References Cited

U.S. PATENT DOCUMENTS

| | | | | |
|---|---|---|---|---|
| 4,651,266 A | * | 3/1987 | Fujioka et al. | 363/35 |
| 4,663,702 A | * | 5/1987 | Tanaka | 363/65 |
| 4,706,178 A | * | 11/1987 | Hayashi | 363/98 |
| 5,406,051 A | * | 4/1995 | Lai | 363/17 |
| 5,486,752 A | * | 1/1996 | Hua et al. | 323/222 |
| 5,661,390 A | * | 8/1997 | Lipo et al. | 318/803 |
| 5,694,307 A | * | 12/1997 | Murugan | 363/37 |
| 5,771,163 A | * | 6/1998 | Moriguchi et al. | 363/71 |
| 5,999,423 A | * | 12/1999 | Steinke et al. | 363/47 |

* cited by examiner

*Primary Examiner*—Peter S. Wong
*Assistant Examiner*—Gary L. Laxton
(74) *Attorney, Agent, or Firm*—Oblon, Spivak, McClelland, Maier & Neustadt, P.C.

(57) ABSTRACT

A power supply device for an electromotive railcar, including a series circuit composed of a plurality of first capacitors, connected to receive a first DC voltage from an electric power line; a plurality of DC/AC/DC converters. Each of the DC/AC/DC converters including an inverter bridge with an input thereof connected in parallel to one of the first capacitors and having a plurality of power transistors, an insulating transformer with a high carrier frequency and having a primary winding connected to an output of the inverter bridge, and a rectifier circuit connected to a secondary winding of the insulating transformer to output a DC voltage. The power supply device further including a smoothing circuit including a DC reactor and a second capacitor for smoothing the DC voltages output from the rectifier circuits of the DC/AC/DC converters, the smoothing circuit generating a second DC voltage; and a three-phase inverter including a bridge circuit having a plurality of power transistors, the three-phase inverter generating a three-phase AC voltage on the basis of the second DC voltage. The respective outputs of the rectifier circuits of the DC/AC/DC converters are connected to each other in parallel.

8 Claims, 4 Drawing Sheets

POWER SUPPLY DEVICE FOR ELECTROMOTIVE RAILCAR

BACKGROUND OF THE INVENTION

1. Field of the Invention

This invention relates to a power supply device for an electromotive railcar which insulates a three-phase alternating current (AC) voltage from a direct current (DC) voltage from an external electric line and, more particularly to a power supply device having DC/AC/DC converters.

2. Discussion of the Background

FIG. 5 is a circuit diagram of a conventional power supply device for an electromotive railcar.

In FIG. 5, the power supply device obtains a DC voltage from an electric power line 1. The DC voltage charges an electrolytic capacitor 8 via a pantograph 2, a fuse 3, a contactor 4 (contact breaker), a DC reactor 5 and an initial charge resistor 7. When the electrolytic capacitor 8 is charged to a predetermined voltage, a conducting thyristor 6 connected in parallel with the initial charge resistor 7 turns on. Then a three-phase inverter 9 is operated.

The three-phase inverter 9 generates a three-phase AC voltage 13 on the basis of the DC voltage from the electric power line 1. Output waveforms of the three-phase inverter 9 are well-known PWM (Pulse Width Modulation) sinewaves including many higher harmonics.

Therefore, the higher harmonics are removed by passing the voltage signal through an AC filter comprising an AC reactor 10 for smoothing and an AC capacitor 11, and then a commercial power signal with 50 Hz or 60 Hz and 200V is obtained. The electrolytic capacitor 8 and the three-phase inverter 9 are coupled to a ground 14.

The commercial power signal is mainly used for operating air conditioners and lighting on railcars. Moreover, the commercial power signal is insulated through an insulating transformer 12 with a commercial carrier frequency for the purpose of insulating the three-phase AC voltage 13 from the DC voltage from the electric power line 1.

After a commercial voltage (for example 270V ) is obtained, the commercial voltage is insulated by the insulating transformer 12 whose carrier frequency is a commercial frequency of 50 Hz or 60 Hz. A control device disclosed in Japanese Patent Disclosure (kokai) No. 7-31156 is applicable for the controller of the three-phase inverter 9.

However, there are some problems in the conventional power supply device of FIG. 5.

First, the insulating transformer 12 becomes heavy and large, because the carrier frequency is a relatively low commercial frequency. Moreover, the insulating transformer 12 causes noise of the commercial frequency.

Further, the same voltage as that of the electric power line 1 is applied to the three-phase inverter 9, the AC reactors 10 and the AC capacitors 11. Therefore, the conventional power supply device must be suitably insensitive to voltage fluctuations and becomes collectively large and costly.

Furthermore, load fluctuation from load objects, such as air conditioners or lighting, causes an adverse influence on the current of the DC voltage from the electric power line 1. Therefore, the electrolytic capacitor 8 charged with the DC voltage must be large enough to remove a ripple wave (50 Hz or 60 Hz) caused by the load fluctuation.

SUMMARY OF THE INVENTION

Accordingly, one object of this invention is to provide a miniaturized, light weight, low noise and low price power supply device for an electromotive railcar. The present invention provides a power supply device for an electromotive railcar, and comprises a first capacitor connected to receive the DC voltage for outputting a first DC voltage. The power supply device also comprises a DC/AC/DC converter that includes an inverter bridge having power transistors connected to the first capacitor in parallel, an insulating transformer with high carrier frequency having an primary winding connected to an output of the inverter bridge, and a rectifier circuit connected to a secondary winding of the insulating transformer to receive a second DC voltage. The power supply device further comprises a three-phase inverter having a bridge circuit of power transistors for generating a three-phase AC voltage on the basis of the second DC voltage.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
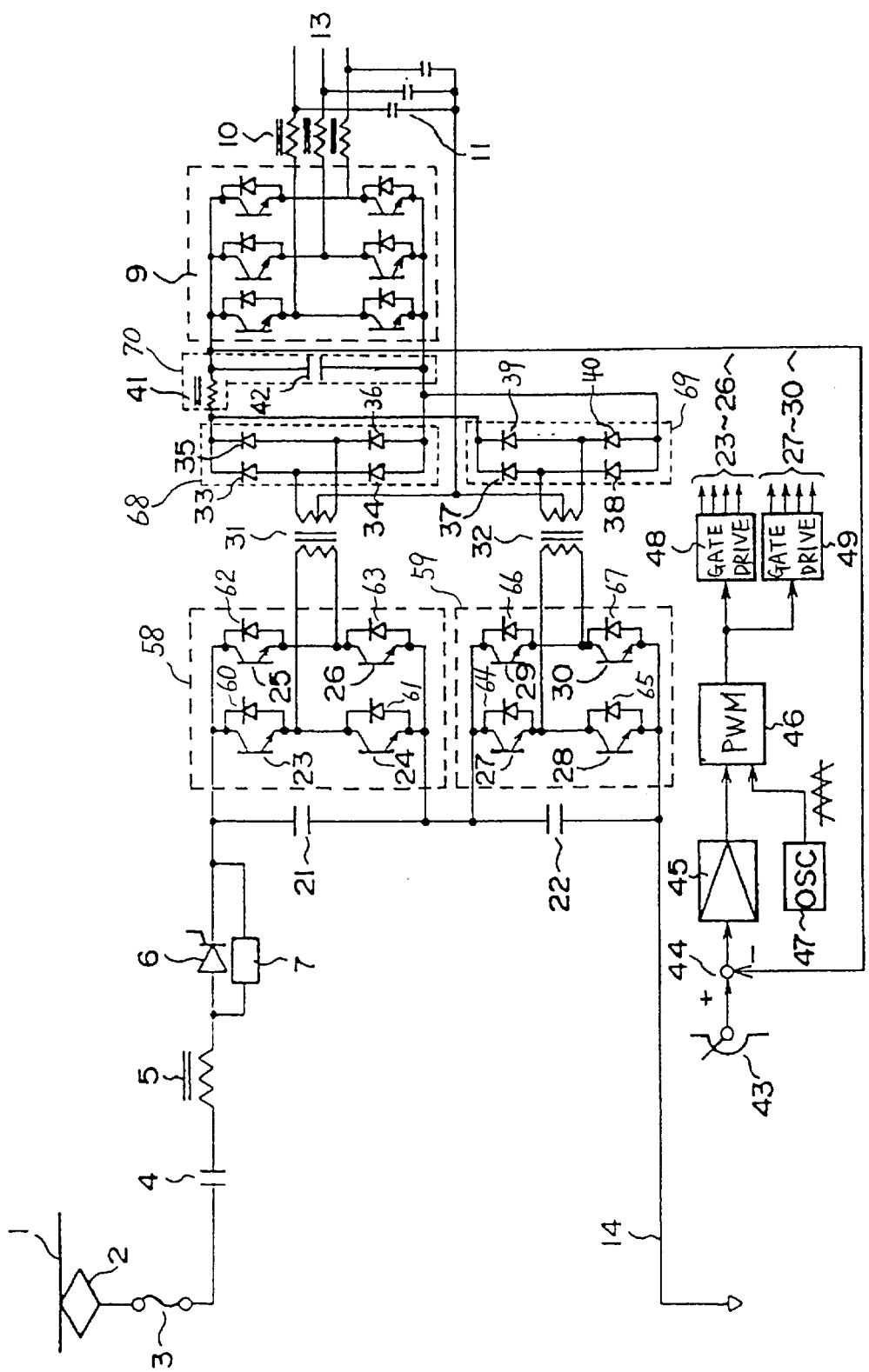
FIG. 1 is a circuit diagram showing a power supply device for an electromotive railcar according to a first embodiment of the present invention.

Referring now to the drawings, wherein like reference numerals designate identical or corresponding parts throughout the several views, the embodiments of the present invention are described below.

FIG. 1 is a circuit diagram showing a power supply device for an electromotive railcar according to a first embodiment of the present invention. The power supply device of the first embodiment of the present invention omits the electrolytic capacitor 8 and the insulating transformer 12 of the conventional power supply device of FIG. 5 and adds some elements as described below.

The power supply device for an electromotive railcar receives a first DC voltage from an electric power line 1.

A series circuit of a pair of first capacitors 21, 22 is connected to receive the first DC voltage from the electric power line 1 via a pantograph 2, a fuse 3, a contactor 4, a DC reactor 5, and either a conducting thyristor 6 or an initial charge resistor 7.

An H-type inverter bridge 58 comprises a plurality of power transistors 23–26 and a plurality of diodes 60–63. An H-type inverter bridge 59 comprises a plurality of power transistors 27–30 such as IGBT (Insulated Gate Bipolar Transistor) and a plurality of diodes 64–67. The H-type inverter bridge 58 is connected in parallel to a first capacitor 21. The H-type inverter bridge 59 is connected in parallel to a first capacitor 22. The first capacitor 22 and the H-type inverter bridge 58 are coupled to a ground 14.

Thus, the H-type inverter bridges 58, 59 are respectively connected to the first capacitors 21, 22 in parallel and are connected to the first DC voltage in serial.

A pair of insulating transformers 31, 32 with a high carrier frequency and having primary windings are respectively connected to outputs of the H-type inverter bridges 58, 59.

Rectifier circuits 68, 69 each are connected to a respective secondary winding of the insulating transformers 31, 32 and comprise a corresponding bridge circuit of diodes 33–36 and 37–40, respectively, in the form of a center tap. The outputs of rectifier circuits 68, 69 are connected in parallel to each other.

A pair of DC/AC/DC converters comprises a respective one of the H-type inverter bridges 58, 59, a respective one of the insulating transformers 31, 32, and a respective one of the rectifier circuits 68, 69.

A smoothing circuit 70 comprises a DC reactor 41 and a second capacitor 42 and is connected to the outputs of the rectifier circuits 68, 69 to form a second DC voltage. The three-phase AC voltage 13 is obtained from the three-phase inverter 9 on the basis of the second DC voltage.

Further, each of the AC filters comprising a series circuit of the AC reactor 10 and the AC capacitor 11 is connected to the output of each phase of the three-phase inverter 9. Terminals of the AC capacitors 11 are connected to a neutral point (0V) of the secondary windings of the insulating transformers 31, 32, that is, the neutral point (0V) of the second DC voltage.

A control circuit for the power transistors 23–30 of the H-type inverter bridges 58, 59 of the DC/AC/DC converters is described as follows.

A reference voltage of the DC/AC/DC converters' output is determined by a voltage setter 43. An adder 44 is coupled to the voltage setter 43 and the output of the smoothing circuit 70 and calculates a difference between the reference of a DC voltage and the second DC voltage. An amplifier 45 amplifies the difference with a proportional integral operation. A PWM (Pulse Width Modulation) generator 46 compares the amplified difference with the output of a triangular wave generator 47 and modulates the pulse width. A plurality of gate drive amplifiers 48, 49 for driving the power transistors 23–26 and 27–30, respectively, amplifies the modulated digital wave signal and insulates the power transistors 23–26 and 27–30 from the signal.

The DC/AC/DC converters control the high voltage of the first DC voltage so as to obtain a constant DC voltage suited for the three-phase AC voltage 13 generated by the three-phase inverter 9. Although the first DC voltage is changeable, the DC/AC/DC converters keep the output steady.

A description of the operation of the power supply device of FIG. 1 follows.

In FIG. 1, the power supply device obtains the first DC voltage from the electric power line 1 via the pantogragh 2. The first DC voltage charges the first capacitors 21, 22 via the fuse 3, the contactor 4, the DC reactor 5 and the initial charge resistor 7. When the first capacitors 21, 22 are charged to a predetermined voltage, the conducting thyristor 6 connected in parallel with the initial charge resistor 7 turns on.

The output signals of the first capacitors 21, 22 are respectively converted into AC voltages by the H-type inverter bridges 58, 59 controlled by the respective gate drive amplifiers 48, 49. The AC voltages are insulated by the insulating transformers 31, 32 and then converted into a DC voltage by the rectifier circuits 68, 69.

The smoothing circuit 70 smoothes the DC voltage to obtain the second DC voltage. The three-phase inverter 9 generates the three-phase AC voltage 13 on the basis of the second DC voltage.

The AC filters composed of AC reactors 10 and AC capacitors 11 remove the higher harmonics of the three-phase AC voltage 13 to obtain a commercial voltage with a fundamental wave such as 50 Hz or 60 Hz frequency.

Thus, a stable DC voltage for the second DC voltage is obtained without being influenced by the voltage of the electric power line 1 (the first DC voltage).

The power supply device of the first embodiment has the following effects.

Figure 5:
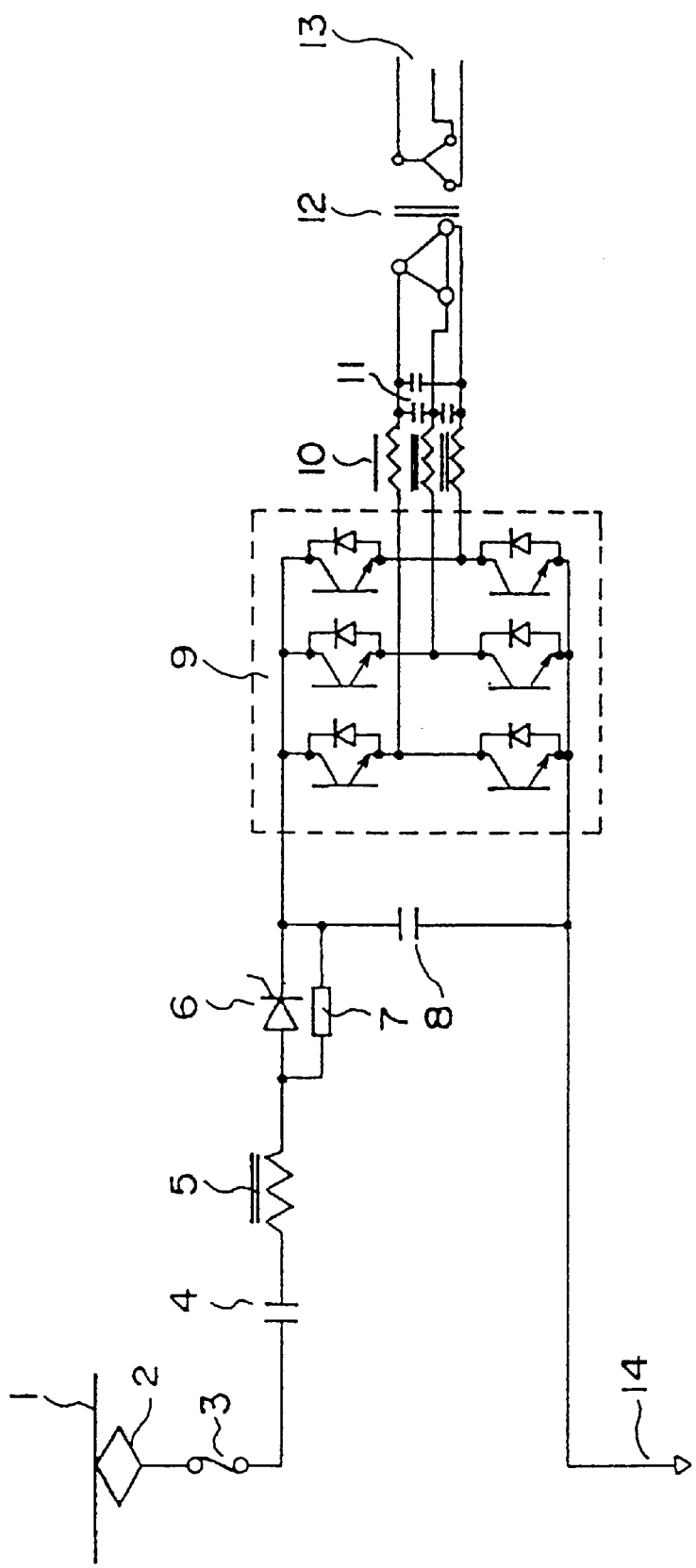
FIG. 5 is a circuit diagram showing a conventional power supply device for an electromotive railcar.

First, since the insulating transformers 31, 32 are designed with a high carrier frequency and excited with a several KHz carrier frequency generated by the power transistors of the H-type inverter bridges 58, 59, it makes both size and weight of the insulating transformers 31, 32 smaller by ¼ to ⅛ of corresponding elements of the conventional power supply device of FIG. 5, and further attenuates noise.

Second, the voltage susceptibility of the secondary side of the insulating transformers 31, 32 can be different from that of the primary side. Thus, the components of the primary side handle high voltages, such as a high voltage of 1500V for the first DC voltage. In general, for a three-phase AC voltage 13 of less than 440V, the DC/AC/DC converters output voltage is about 600V. So the components of the secondary side can be designed with relatively low voltage susceptibility and use both small-sized and low cost equipment.

Third, if the sharing of loads between the H-type inverter bridges 58, 59 changes, the H-type inverter bridges 58, 59 are not able to share the first DC voltage by halves. Further, if almost all the first DC voltage is applied to one of the H-type inverter bridges 58, 59, the power transistors 23–26 or 27–30 may fail. However, since each of the outputs of the rectifier circuits 68, 69 is connected in parallel, the unbalance load sharing between the H-type inverter bridges 58, 59 is canceled.

Specifically, if the load in the H-type inverter bridges 58 increases, the voltage of the first capacitor 21 connected to the H-type inverter bridge 58 decreases. Consequently, the output voltage of the secondary winding also decreases. On the other hand, the voltage of the other first capacitor 22 increases and the output voltage of the secondary winding connected to the other H-type inverter bridge 59 increases.

As a result, the load concentrates on the H-type inverter bridge 59 with a higher voltage. This operation is taken quickly and finally the load sharing between the H-type inverter bridges 58, 59 is equal.

Furthermore, each of the DC voltages applied to the H-type inverter bridges 58, 59 becomes equal. Consequently, the power transistors 23–30 can be used as low voltage-proof elements.

Fourth, since the terminals of the AC capacitors 11 are connected to a neutral point (0V) of the secondary windings of the insulating transformers 31, 32 (e.g., the neutral point (0V) of the second DC voltage), the inductive interference caused by the three-phase inverter 9 is attenuated. Specifically, since the peak current applying to the AC capacitors 11 is half of the amplitude of the current applying to the AC capacitors 11, the inductive interference caused by the switching noise of the three-phase inverter 9 is attenuated.

As described above in the first embodiment, the power supply device obtains a steady DC voltage as the second DC voltage with no influence of the first DC voltage from the electric power line 1 and achieves miniaturization, light weight, low level noise and attenuation of inductive interference.

Further, the number of the first capacitors 21, 22 and the DC/AC/DC converters can be designed in response to the first DC voltage (for example, 600V or 1500V). For example, in the case of 600V, the number of the first capacitors 21, 22 and the DC/AC/DC converters may be two as shown in FIG. 1. In the case of 1500V, three first capacitors and three DC/AC/DC converters may be used. Therefore, this embodiment optimizes the elements of cost, size and weight and achieves miniaturization, light weight and low cost.

Furthermore, the insulating transformers 31, 32 in the first embodiment are designed the carrier frequency for the range of 1 to 6 KHz. Therefore, the first embodiment optimizes the elements of cost, size and weight and achieves miniaturization, light weight and low noise.

To achieve low noise, the generated frequency should be less than the audio range (15 KHz). Accordingly, the carrier frequency should be less than 7.5 KHz, half of 15 KHz, as calculated in accordance with conventional theory.

On the other hand, to achieve miniaturization and light weight, a carrier frequency less than 6 KHz is useful. More than a 6 KHz carrier frequency may not achieve sufficient tradeoffs in view of the switching loss of the power transistors 23–30. Consequently, a 1 to 6 KHz carrier frequency is useful from the point of view of miniaturization, light-weight and low noise.

Further, the capacity of the second capacitor 42 is large enough, the same as that of the capacitor 8 (FIG. 5), so as to remove a ripple wave with a predetermined frequency which is a commercial frequency (50 Hz or 60 Hz). Consequently, the load fluctuation caused by the load objects connected to the three-phase inverter 9 does not influence the current of the first DC voltage from the electric power line 1. As a result, the capacity of the first capacitors 21, 22 take no account of a ripple wave with a commercial frequency caused by the load fluctuation and take account of a 180 Hz or 360 Hz ripple wave in the electric power line 1. As a practical matter, the capacity of the first capacitors 21, 22 is ⅓ or ⅙ of the second capacitor 42.

The ripple wave passed through the first capacitors 21, 22 is 180 Hz or 360 Hz under the influence of the electric power line 1 and the ripple wave passed through the second capacitor 42 is 50 Hz or 60 Hz under the influence of three-phase inverter 9. If the second capacitor 42 can filter the 50 Hz ripple wave, the first capacitor 21, 22 accounts for only the 180 Hz or 360 Hz ripple wave.

Consequently, since the ripple wave with commercial frequency caused by the load fluctuation is filtered by the second capacitor 42, a small capacitor can be used as the first capacitors 21, 22.

According to a second embodiment of the present invention, each of the insulating transformers 31, 32 has a common core; the number of turns of the primary windings are the same in the DC/AC/DC converters; and the number of turns of the secondary windings are the same in the DC/AC/DC converters respectively. In this embodiment, the sharing of the load of the DC/AC/DC converters is substantially equal. Further, the DC/AC/DC converters are simultaneously driven with the pulse width modulated digital wave signal.

Figure 2:
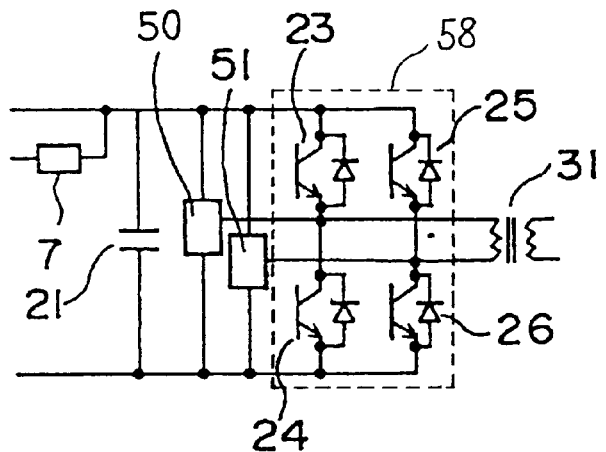
FIG. 2 is a circuit diagram of a partial resonance switching circuit of a third embodiment of the present invention.

FIG. 2 is a circuit diagram showing a partial resonance switching circuit of a third embodiment of the present invention.

As shown in FIG. 2, this embodiment deletes the first capacitor 22, the H-type inverter bridge 59 with the transistors 27–30, the insulating transformer 32 and the rectifier circuit with the diodes 37–40 in FIG. 1. The circuit of this embodiment has one DC/AC/DC converter comprising the first capacitor 21, the H-type inverter bridge 58 having the transistors 23–26, the insulating transformer 31 and the rectifier circuit (not shown in FIG. 2) with the diodes 33–36. Further, partial resonance switching circuits 50, 51 are connected in parallel to the H-type inverter bridge 58. The commutation system of the H-type inverter bridge 58 is a partial resonance type which switches the power transistors 23–26 at the time zero-voltage or zero-current is applied to the power transistors 23–26.

Therefore, the switching loss of the power transistors 23–26 is minimized or deleted and only the ON loss of the power transistors 23–26 is accounted for.

In general, a switching loss is generated at a transient stage when a power transistor switches ON to OFF or OFF to ON, and it is calculated by the product of voltage and current. An ON loss is generated at a steady state after the transient stage while a power transistor is ON. It is also calculated by the product of voltage and current. In a DC/AC/DC converter with a high frequency insulating transformer, the switching loss of transistors increases in addition to the ON loss of the transistors.

In the third embodiment of the present invention, since the commutation system of the H-type inverter bridge 58 is a partial resonance type which switches the power transistors 23–26 at the time zero-voltage or zero-current is applied to the power transistor, the switching loss of the power transistors is minimized or deleted. The loss accompanied with high frequency switching can be reduced.

Figure 3:
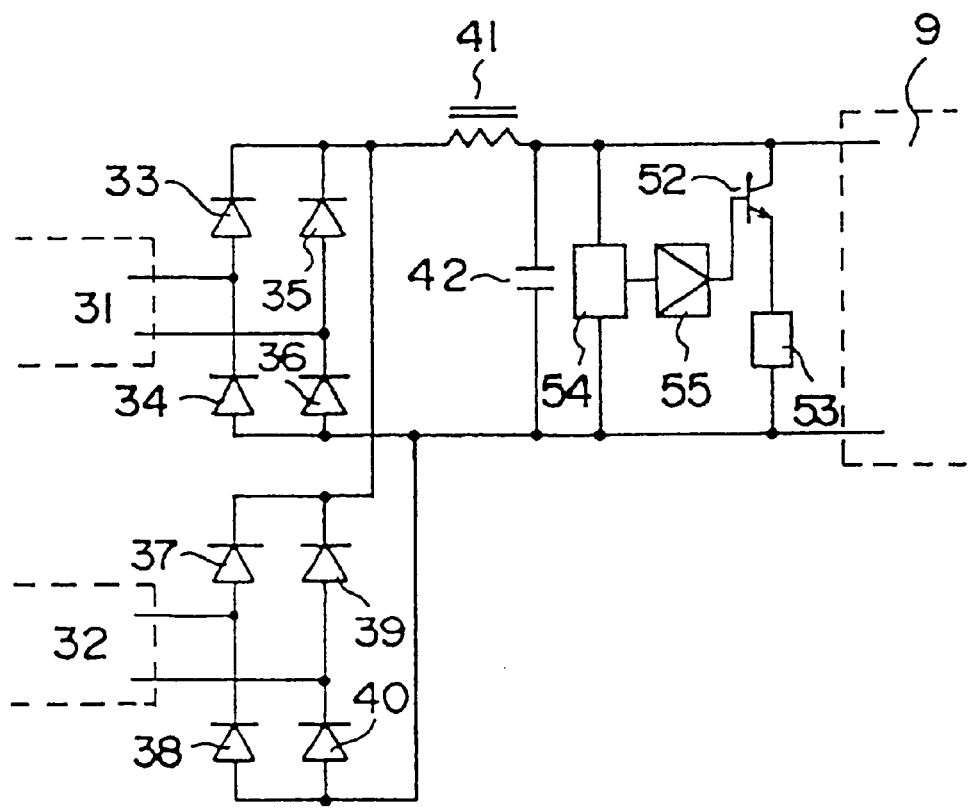
FIG. 3 is a circuit diagram of a discharge circuit of a fourth embodiment of the present invention.

FIG. 3 is the circuit diagram showing the discharge circuit of a fourth embodiment of the present invention.

As shown in FIG. 3, this embodiment adds a discharge circuit, connected to the second capacitor 42 in parallel, comprising a series circuit of a power transistor 52 and a discharge resistor 53, and a voltage surveillance circuit 54, connected to a second capacitor 42 in parallel, for detecting the second DC voltage.

If the voltage surveillance circuit 54 detects a voltage over a predetermined voltage, it turns on the power transistor 52 via a transistor drive amplifier 55 in order to discharge regeneration energy from load objects. The discharge circuit of this embodiment protects the transistors of the three-phase inverter 9 from high voltage of the second DC voltage.

In brief, the power supply unit in FIG. 1 may not discharge regenerated energy from load objects, such as air conditioners and lighting. Consequently once the second DC voltage rises over the rated voltage of a transistor, the transistor may fail.

In this embodiment, since the voltage surveillance circuit 54 detects the second DC voltage, if the second DC voltage rises over the predetermined voltage, first the voltage surveillance circuit 54 outputs a detecting signal to the transistor drive amplifier 55, then the transistor drive amplifier 55 turns on the power transistor 52, and then the regenerated current is passed through the discharge resistor 53. Finally, the regenerated energy is discharged and the second DC voltage drops.

The power transistor 52 turns off and stops discharge when the second DC voltage drops below the second predetermined voltage. The second predetermined voltage for turning off the power transistor 52 is lower than the predetermined voltage for turning on the power transistor 52. The power transistor 52 keeps an average voltage constant and discharges the regenerated energy by repeatedly switching ON and OFF.

Therefore this embodiment controls an increase in the second DC voltage caused by load objects, and protects the power transistors of the three-phase inverter 9 from application of a high voltage.

Figure 4:
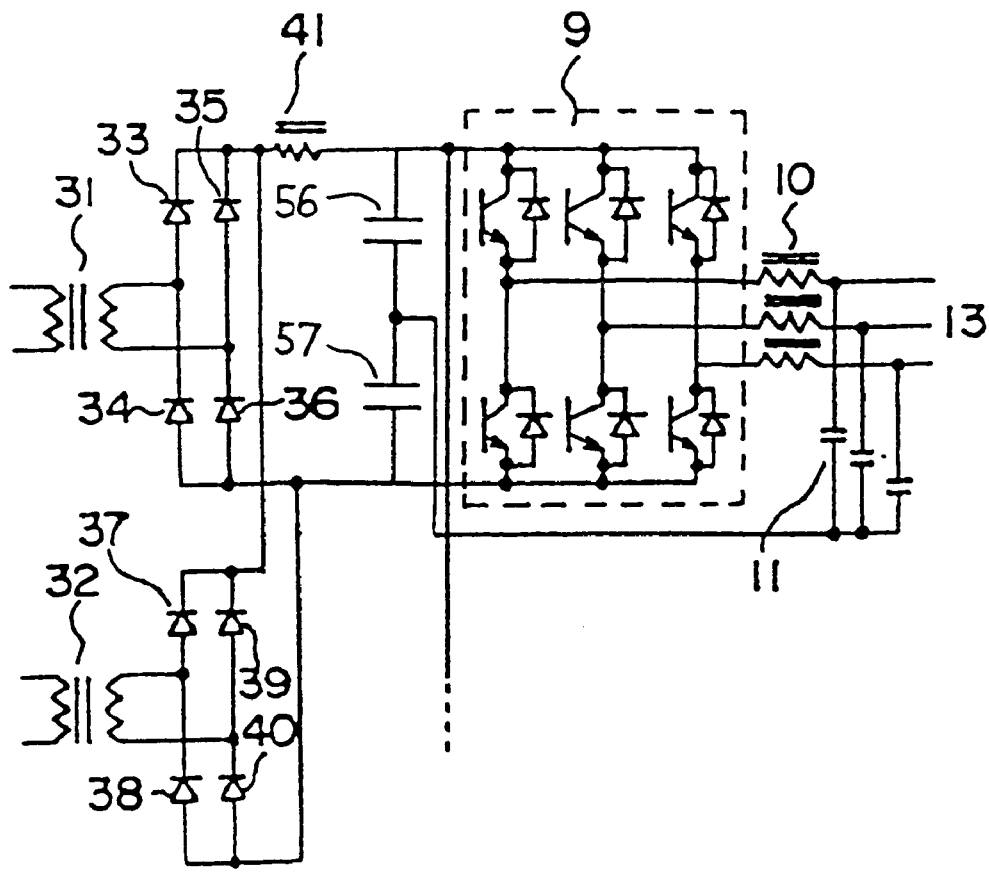
FIG. 4 is a circuit diagram showing a smoothing circuit of a fifth embodiment of the present invention.

FIG. 4 is the circuit diagram showing a smoothing circuit according to a fifth embodiment of the present invention.

As shown in FIG. 4, the smoothing circuit of this embodiment comprises a series circuit of a pair of capacitors 56, 57 instead of the second capacitor 42. Further, one terminal of each of the AC capacitors 11 is connected to a neutral point between the capacitors 56, 57.

Since the terminals of the AC capacitors 11 are connected to a neutral point (0V) between the capacitors 56, 57 (e.g., the neutral point (0V) of the second DC voltage), the peak current of the AC capacitors 11 is half of that amplitude and the capacity of AC capacitors 11 can be smaller. Further, the inductive interference caused by the three-phase inverter 9 is attenuated.

Consequently, the power supply device of the present invention can be miniaturized, light weight, low noise and low price.

What is claimed is:

1. A power supply device for an electromotive railcar, comprising:
   a plurality of first capacitors connected in series and adapted to receive a first DC voltage across said series connected capacitors from an electric power line;
   a plurality of DC/AC/DC converters, each of said DC/AC/DC converters including an inverter bridge with an input of said inverter bridge connected in parallel to one of said first capacitors and having a plurality of power transistors, an insulating transformer with a high carrier frequency and having a primary winding connected to an output of said inverter bridge, and a rectifier circuit connected to a secondary winding of said insulating transformer to output a DC voltage;
   a smoothing circuit including a DC reactor a second capacitor for smoothing the DC voltages output from said rectifier circuits of said DC/AC/DC converters, said smoothing circuit generating a second DC voltage;
   a three-phase inverter including a bridge circuit having a plurality of power transistors, said three-phase inverter generating a three-phase AC voltage on the basis of said second DC voltage; and
   an AC filter connected to an output of said three-phase inverter and including a series connected circuit comprising an AC reactor and an AC capacitor,
   wherein one terminal of said AC capacitor is connected to a neutral point of said secondary winding of said insulating transformer, and
   wherein respective outputs of the rectifier circuits of said DC/AC/DC converters are connected to each other in parallel.

2. The power supply device of claim 1, wherein a carrier frequency band of the insulating transformers of said DC/AC/DC converters is in the range of 1 to 6 KHz.

3. The power supply device of claim 1, wherein said plurality of first capacitors comprise one of (i) two first capacitors and (ii) three first capacitors, and said plurality of DC/AC/DC converters comprise one of (i) two DC/AC/DC converters and (ii) three DC/AC/DC converters.

4. The power supply device of claim 1, wherein the insulating transformers of said DC/AC/DC converters have a common core,
   a number of turns of the primary windings of the insulating transformers of said DC/AC/DC converters are the same, and
   a number of turns of the secondary windings of the insulating transformers of said DC/AC/DC converters are the same.

5. The power supply device of claim 1, wherein a capacitance of said second capacitor is larger than a sum of capacitances of said first capacitors.

6. The power supply device of claim 5, wherein a capacitance of said second capacitor is between three and six times a sum of capacitances of said first capacitors.

7. A power supply device for an electromotive railcar, comprising:
   a first capacitor connected to receive a first DC voltage from an electric power line;
   a DC/AC/DC converter including an inverter bridge with an input of said inverter bridge connected to said first capacitor and having a plurality of power transistors, an insulating transformer with a high carrier frequency and having a primary winding connected to an output of said inverter bridge, and a rectifier circuit connected to a secondary winding of said insulating transformer to output a DC voltage;
   a smoothing circuit including a DC reactor and a second capacitor for smoothing said DC voltage output from said rectifier circuit of said DC/AC/DC converter, said smoothing circuit generating a second DC voltage;
   a three-phase inverter including a bridge circuit having a plurality of power transistors, said three-phase inverter generating a three-phase AC voltage on the basis of said second DC voltage; and
   an AC filter connected to an output of said three-phase inverter and including a series connected circuit comprising an AC reactor and an AC capacitor,
   wherein one terminal of said AC capacitor is connected to a neutral point of said secondary winding of said insulating transformer, and
   wherein a communication system of said inverter bridge is of a partial resonance type.

8. The power supply device of claims 1 or 7, further comprising:
   a discharge circuit including a series connected circuit comprising a power transistor and a discharge resistor, said series connected circuit connected in parallel to said second capacitor of said smoothing circuit; and
   a voltage surveillance circuit connected to said smoothing circuit for detecting said second DC voltage and for turning on said power transistor when said voltage surveillance circuit detects that said second DC voltage is greater than a predetermined voltage.

* * * * *